United States Patent
Keller et al.

(10) Patent No.: US 6,829,561 B2
(45) Date of Patent: Dec. 7, 2004

(54) METHOD FOR DETERMINING A QUALITY FOR A DATA CLUSTERING AND DATA PROCESSING SYSTEM

(75) Inventors: Martin Keller, Vaihingen (DE); Stefan Raspl, Tamm (DE)

(73) Assignee: International Business Machines Corporation, Armonk, NY (US)

( * ) Notice: Subject to any disclaimer, the term of this patent is extended or adjusted under 35 U.S.C. 154(b) by 13 days.

(21) Appl. No.: 10/315,668

(22) Filed: Dec. 9, 2002

(65) Prior Publication Data

US 2003/0182082 A1 Sep. 25, 2003

(30) Foreign Application Priority Data

Mar. 16, 2002 (EP) ............................................ 02006029

(51) Int. Cl.⁷ .............................................. G06F 15/04
(52) U.S. Cl. ...................... 702/179; 702/182; 702/183; 702/189; 702/194
(58) Field of Search .................................. 702/108, 179, 702/182, 183, 185, 189, 199; 382/111, 228; 435/6

(56) References Cited

U.S. PATENT DOCUMENTS

| | | | | |
|---|---|---|---|---|
| 5,341,142 A | * | 8/1994 | Reis et al. ..................... | 342/64 |
| 5,828,067 A | * | 10/1998 | Rushbrooke et al. .. | 250/370.11 |
| 6,203,987 B1 | * | 3/2001 | Friend et al. ................... | 435/6 |
| 6,629,097 B1 | * | 9/2003 | Keith ............................. | 707/5 |
| 6,640,145 B2 | * | 10/2003 | Hoffberg et al. .............. | 700/83 |
| 6,650,779 B2 | * | 11/2003 | Vachtesvanos et al. ..... | 382/228 |
| 6,661,842 B1 | * | 12/2003 | Abousleman .......... | 375/240.11 |

* cited by examiner

Primary Examiner—Marc S. Hoff
Assistant Examiner—Felix Suarez
(74) Attorney, Agent, or Firm—Kunzler & Associates

(57) ABSTRACT

This invention relates to a method for determining a quality for a data clustering, said data clustering resulting in a plurality of clusters each cluster having a cluster identifier, the method comprising the steps of:

- determining a set of observed values for at least one of the clusters by mapping the cluster identifier of said one of the clusters to a first predefined value and by mapping the cluster identifiers of other clusters to a second predefined value, and
- calculating a normalized statistical coefficient based on the set of observed values to determine the quality for said one of the clusters.

14 Claims, 2 Drawing Sheets

METHOD FOR DETERMINING A QUALITY FOR A DATA CLUSTERING AND DATA PROCESSING SYSTEM

CLAIM OF PRIORITY

This application claims the foreign priority benefits under 35 U.S.C. §119 of European application No. 02006029.9 filed on Mar. 16, 2002, which is incorporated herein by reference.

BACKGROUND OF THE INVENTION

1. Field of the Invention

The present invention relates to the field of data clustering and in particular to clustering algorithms and quality determination.

2. Background and Prior Art

Clustering of data is a data processing task in which clusters are identified in a structured set of raw data. Typically the raw data consists of a large set of records each record having the same or a similar format. Each field in a record can take any of a number of logical, categorical, or numerical values. Data clustering aims to group such records into clusters such that records belonging to the same cluster have a high degree of similarity.

A variety of algorithms are known for data clustering. The K-means algorithm relies on the minimal sum of Euclidean distances to center of clusters taking into consideration the number of clusters. The Kohonen-algorithm is based on a neural net and also uses Euclidean distances. IBM's demographic algorithm relies on the sum of internal similarities minus the sum of external similarities as a clustering criterion. Those and other clustering criteria are utilized in an iterative process of finding clusters.

A common disadvantage of such prior art clustering algorithms is that different clustering algorithms applied to the same set of data may deliver largely different results. Even if the same algorithm is applied to the same set of data using a different set of parameters as a starting condition a different result is likely to occur. In the prior art no objective criterion exists to compare the results of such clustering operations.

One field of application of data clustering is data mining. From U.S. Pat. No. 6,112,194 a method for data mining including a feedback mechanism for monitoring performance of mining tasks is known. A user selected mining technique type is received for the data mining operation. A quality measure type is identified for the user selected mining technique type. The user selected mining technique type for the data mining operation is processed and a quality indicator is measured using the quality measure type. The measured quality indication is displayed while processing the user selected mining technique type for the data mining operations.

From U.S. Pat. No. 6,115,708 a method for refining the initial conditions for clustering with applications to small and large database clustering is known. It is disclosed how this method is applied to the popular K-means clustering algorithm and how refined initial starting points indeed lead to improved solutions. The technique can be used as an initializer for other clustering solutions. The method is based on an efficient technique for estimating the modes of a distribution and runs in time guaranteed to be less than overall clustering time for large data sets. The method is also scalable and hence can be efficiently used on huge databases to refine starting points for scalable clustering algorithms in data mining applications.

From U.S. Pat. No. 6,100,901 a method for visualizing a multi-dimensional data set in which the multi-dimensional data set is clustered into k clusters, with each cluster having a centroid is known. Either two distinct current centroids or three distinct non-collinear current centroids are selected. A current 2-dimensional cluster protection is generated based on the selected current centroids. In the case when two distinct current centroids are selected, two distinct target centroids are selected, with at least one of the two target centroids being different from the two current centroids.

From U.S. Pat. No. 5,857,179 a computer method for clustering documents and automatic generation of cluster keywords is known. An initial document by term matrix is formed, each document being represented by a respective M dimensional vector, where M represents the number of terms or words in a predetermined domain of documents. The dimensionality of the initial matrix is reduced to form resultant vectors of the documents. The resultant vectors are then clustered such that correlated documents are grouped into respective clusters. For each cluster, the terms having greatest impact on the documents in that cluster are identified. The identified terms represent key words of each document in that cluster. Further, the identified terms form a cluster summary indicative of the documents in that cluster.

SUMMARY OF THE INVENTION

A principal object of the present invention is to provide a method, data processing system and computer program product for data clustering and quality determination such that the qualities of clustering results can be compared on an objective basis. The quality index for a clustering result obtained in accordance with the invention is independent of the clustering algorithm used.

Rather than relying on the clustering algorithm itself for quality determination the invention relies on a statistical analysis of the clustering result to determine the quality of the clustering.

It is a particular advantage of the present invention that the quality measure is objective, i.e. independent of the method employed to perform the clustering and that it is normalized. This is why the present invention can be employed for any clustering method. Further the results provided by different clustering methods can be compared in an objective way in order to identify clustering results having a high quality.

In accordance with a preferred embodiment of the present invention a quality measure is determined for an individual cluster of the data clustering result by means of a set of observed values. The set of observed values is determined by mapping the cluster identifier of the cluster for which the quality measure is to be determined to a predefined numerical value such as "1".

The cluster identifiers of the other clusters of the clustering result are mapped to another predefined numerical value such as "0". One way of creating the set of observed values for the purposes of determining the quality measure for one of the clusters is to organize the data records which have been clustered into a table comprising the attribute values for each of the records, the cluster identifier which has been assigned to the records and an additional column for the mapped cluster identifiers.

By means of this set of observed values comprising the attributes values and the mapped cluster identifiers for each of the records, which have been clustered, a normalized statistical coefficient is calculated.

In accordance with a preferred embodiment of the invention the normalized statistical coefficient is the R squared coefficient. The R squared coefficient is also called the "coefficient of determination". The R squared coefficient is the square of Pearson's correlation coefficient.

Pearson's correlation coefficient is as such known from statistics. It is used in the prior art for comparisons between different data sets. Alternatively Spearman's correlation coefficient is used instead of Pearson's correlation coefficient.

In accordance with a further preferred embodiment of the invention an overall quality measure is calculated for the result of the data clustering integrating the individual quality measures obtained separately for the individual clusters. This is done by calculating a weighted average of the quality measures of the clusters. The number of records within a given cluster serves as the weighting factor (i.e. weighting coefficient).

Further the present invention also enables to improve a given data clustering method. This is done by integrating the quality determination of the data clustering result provided by a given data clustering method within the data clustering procedure. For example after the data clustering has been performed in a first iteration the quality is determined for each of the clusters.

Those clusters, which have a low quality measure, are selected to improve the quality of the clustering. This can be done by hierarchical clustering. To perform the hierarchical clustering the cluster results of the first iteration are subjected to a successive further clustering operation.

To perform the successive clustering operation the same or another data clustering method as in the first iteration can be selected. After the further clustering has been done for the selected clusters the quality is determined again to check if the quality has improved. If necessary further iterations are performed until a sufficient quality measure has been reached.

BRIEF DESCRIPTION OF THE DRAWINGS

In the following, preferred embodiments of the invention are described in greater detail by making reference to the drawings in which.

DETAILED DESCRIPTION OF THE INVENTION

Figure 1:
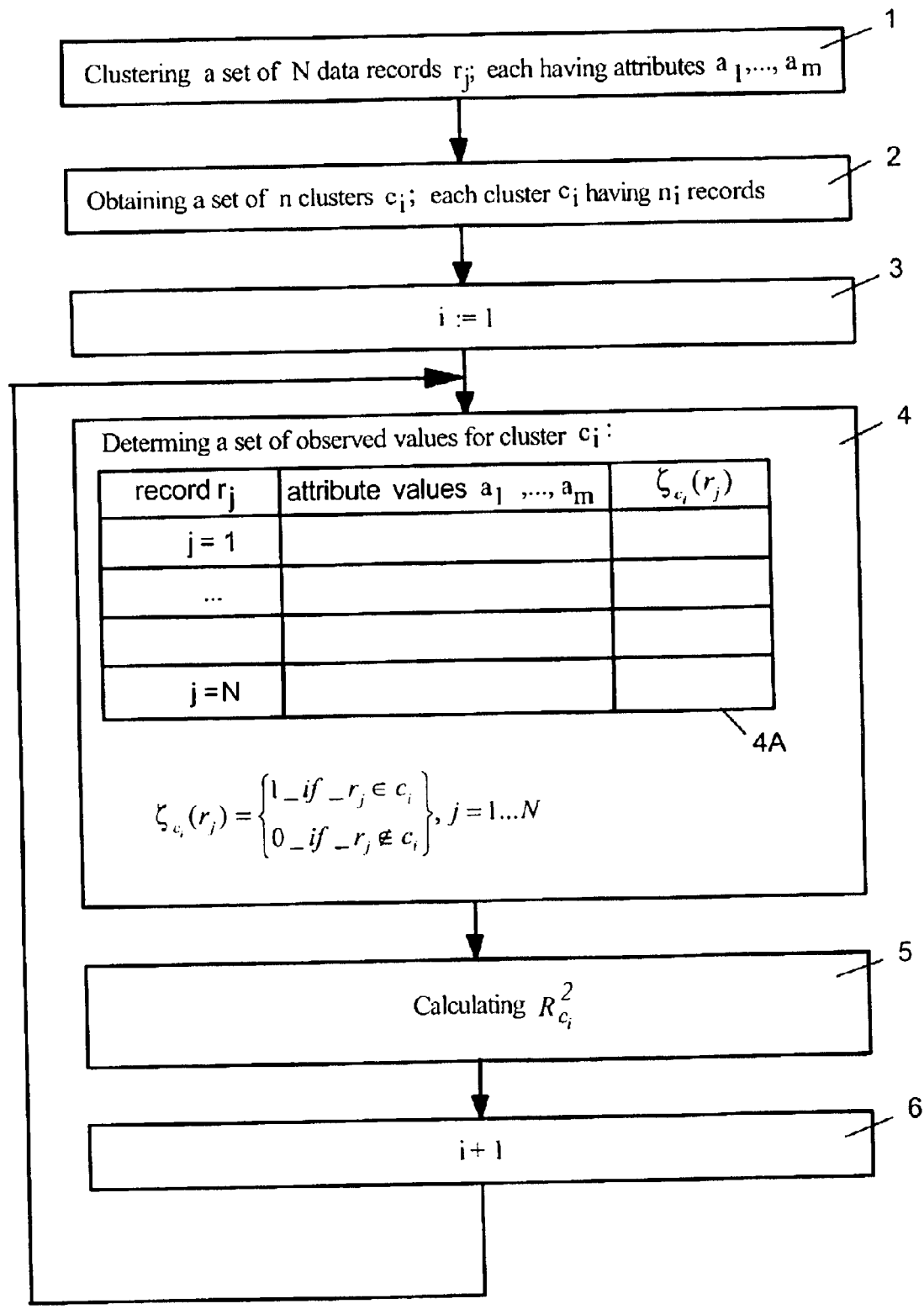
FIG. 1 is a flow chart of a first embodiment of the invention for determining a quality for a data clustering.

FIG. 1 is illustrative of a method for determining a quality measure for a cluster, which results from a data clustering operation. The data clustering operation is performed on a given set of N data records each record $r_j$ having the attributes $a_1, \ldots, a_m$. After a clustering run on this set of data records $r_j$, a result is obtained consisting of a set of n clusters $c_i$, $i=1 \ldots n$ where cluster $c_i$ holds $n_i$ records that combine to the total data set T, hence $$T = \bigcup_{i=1}^{n} c_i$$

Further, a new variable $\zeta_{c_i}$ is introduced that is defined as follows:

$$\zeta_{c_i}(r_j) = \begin{Bmatrix} 1\_\text{if}\_r_j \in c_i \\ 0\_\text{if}\_r_j \notin c_i \end{Bmatrix}, i = 1 \ldots n, j = 1 \ldots N \quad (1)$$

$\zeta_{c_i}$ depends upon $r_j$ and therefore upon $a_1, \ldots, a_m$. Select a subset of independent variables $a_{k_1}, \ldots, a_{k_p}$, $1 \leq k_p \leq m$ from $a_1, \ldots, a_m$. Since any single variable out of $a_1, \ldots, a_m$ is already an independent subset, such a subset must exist. One way to find that subset is by utilizing correlation tests.

Hence a regression model is applied to each cluster $c_i$, where $a_{k_1}, \ldots, a_{k_1}$ are the independent variables and $\zeta_{c_i}$ is the depended variable. The result is a regression model of the form $$\zeta_{c_i} = \zeta'_{c_i} + \text{Error} \quad (2)$$

where $$\zeta'_{c_i}$$

is the predicted value determined by $$\zeta'_{c_i} = A + \sum_{j=1}^{p} f(a_{k_j}) \quad (3)$$

Solving this regression model answers the question to what degree the records and the cluster $c_i$ correlate.

Records and cluster $c_i$ are highly correlated if there is a minimum error. This error is determined by an absolute measure called R squared coefficient.

The R squared coefficient measures the correlation between the observed and the predicted value. For example it ranges from 0 to 1 whereas 1 indicates the highest possible correlation. The correlation coefficient R is calculated by dividing the covariance from the observed (i.e. according to the training data) and the predicted values with the variance from the observed values and the variance from the predicted values.

Therefore $$R_{c_i} = \frac{S_{\zeta_{c_i} \zeta'_{c_i}}}{S_{\zeta_{c_i} \zeta'_{c_i}}} \quad (4)$$

where $$S_{\zeta_{c_i} \zeta'_{c_i}}$$

is the empirical covariance of $$\zeta_{c_i}$$

and $$\zeta'_{c_i},$$

which is determined by $$S_{\zeta_{c_i}\zeta'_{c_i}} = \frac{1}{n_i - 1}\left(\sum_{j=1}^{n_i}\left(\zeta_{c_i}\left(r_{c_{ij}}\right) - \zeta_{c_i}\left(r_{c_{ij}}\right)_{mean}\right)\left(\zeta'_{c_i}\left(r_{c_{ij}}\right) - \zeta'_{c_i}\left(r_{c_{ij}}\right)_{mean}\right)\right) \quad (5)$$

where $$\zeta_{c_{ij}}$$

are the observed values and $$\zeta'_{c_{ij}}$$

are the predicted values and where $$r_{c_{i1}}, \ldots, r_{c_{in_i}}$$

are the records belonging to cluster $c_i$.

An absolute clustering for a single cluster $c_1$ is given by $$\psi_{c_i} = R^2_{c_i} \quad (6)$$

The value of $$\psi_{c_i} \in [0; 1]$$

indicates how strong the correlation between the elements and the previously introduced variable $$\zeta_{c_i}$$

is. The higher the absolute value of $\psi_{c_i}$ is, the stronger the correlation.

Hence it is a measure for the correlation between the records and whether they were assigned to belong to cluster $c_i$ or not, as given by $$\zeta_{c_i}.$$

Therefore not only a relative quality criterion for the cluster $c_i$ is obtained but an absolute one, because this enables to rate a given cluster not only against a different result on the same data but against preset quality standards.

The clustering of the records $r_j$ is performed in step 1. Any known clustering method can be employed for this clustering step.

In step 2 the result of the data clustering is outputted. The result consists of a number n of clusters $c_i$, where each cluster $c_i$ has a number of $n_i$ records.

In the following the quality measures for each of the clusters $c_i$ are calculated. The index value i is initialized in step 3 to be equal to 1.

In step 4 a table 4A is determined for the cluster $c_i$ for which the quality is to be calculated. The table 4A comprises the records $r_j$ with their respective attribute values. Further each of the records $r_j$ has assigned its value of $\zeta_{c_i}(r_j)$ which is the mapped cluster identifier of the cluster to which the record $r_j$ belongs.

The table 4A forms the basis for calculating $$R^2_{c_i}$$

in step 5 in accordance with above equation (6). This provides the normalized and absolute quality measure for the cluster $c_i$ of a clustering result.

In step 6 the index i is incremented and the control goes back to step 4 in order to determine the table 4A for the following cluster $c_i$ and to calculate the quality measure $$R^2_{c_c}$$

for the following cluster $c_i$. The steps 4, 5 and 6 are performed repeatedly until all n clusters $c_i$ have been processed.

The present invention also enables to calculate an overall quality measure for the data clustering result.

Because the clusters $c_i$ are unlikely to have the same size, each cluster $c_i$ is weighted with the number of records $n_i$. Hence the overall clustering quality for a set of clusters T is defined by $$\psi_T = \frac{1}{N}\sum_{i=1}^{n}\psi_{c_i}n_i \quad (7)$$

Using $\psi_T$ enables not only to compare the quality of the result of two clustering runs on the same data $r_{j=1}, \ldots, N$, but also the quality of the results of clustering runs on different sets of records $r_{j=1}, \ldots, N$ and $s_{j=1}, \ldots, M$.

Having introduced an absolute clustering criterion, a new criterion can be provided for rating the influence of at least the substantial subset $a_{k_1}, \ldots, a_{k_1}$ of the attributes $a_1, \ldots, a_m$ on a specific cluster $c_i$.

Let us consider a cluster $c_i$. The aim is to find out, how much each of the attributes $a_1, \ldots, a_m$ influences whether a given record $r_j$ belongs to cluster $c_i$ or not. Since the previously introduced variable $\zeta_{c_i}$ gives an exact indicator of this behavior, this aim can also be formulated as follows: We want to find out to what degree $\zeta_{c_i}$ depends upon each of the attributes.

Using the model in accordance with equation (2), the selected regression function $f$ will return a significance value P for each attribute $a_{k_1}, \ldots, a_{k_1}$. P ranges from 0 to 1, where 1 indicates the highest and 0 the lowest possible significance. Since the remaining attributes $a \notin \{a_{k_1}, \ldots, a_{k_1}\}$ are dependent from $a_{k_1}, \ldots, a_{k_1}$, these do not need to be considered anyway.

Up until now, analyzing the outcome of a clustering run remained somewhat of a critical task. Sharp and precise criteria were not available and the final decision, whether a clustering result was sufficiently good enough for the purpose in mind, was left to the user. Up until now, only trained experts with domain specific data knowledge are able to rate the quality of clusters.

The present invention enables to set a quality criterion previous to starting the clustering runs. Furthermore it is now possible to analyze the outcome of a clustering run more deeply by calculating $\psi_{c_i}$ for all $c_i$ i=1, . . . , n and pointing out single, exceptionally bad clusters. These clusters might then be subject to further clustering runs, resulting in new clusters of higher quality and increasing the overall quality $\psi_T$. Alternatively, they might be isolated from the clustering result, leaving a limited but sound model.

Also, many clustering algorithms provide means to limit the maximum number of clusters. By applying the overall clustering quality criterion, iterative clustering algorithms are now possible, where in each run only a small number of clusters is allowed. After calculating $\psi_{c_i}$ for all clusters $c_i$, further runs for all clusters not meeting a preset quality criterion will dramatically increase the quality of the clusters, but at the same time keep the number of clusters to a minimum.

Further the quality measures provided by the present invention can also be used as an integral part of a clustering method to control or monitor the quality of the ongoing clustering operations.

By means of this invention users have an additional indicator characterizing a specific cluster $c_i$. This will result in better understanding of the data. Since clustering algorithms exist that give the possibility to weight the attributes of the records, customization utilizing significance values gained from the proposed technique will furthermore increase the quality of the clustering process.

An example for application of the present invention is given in the following:

Data is provided from the UCI Machine Learning Repository, located at http://www.ics.uci.edu/~mlearn/MLRepository.html. As these are, with a few exceptions, datasets publicly available, the only additional prerequisite to reproduce the following examples is the IBM Intelligent Miner for Data V6.1. In theory, any other clustering and/or statistics package would do as well, but as clustering algorithms are implemented slightly different upon the various offerings, one cannot expect to receive the same results for the clustering runs.

We used the Pima Indians Diabetes Dataset, containing 768 records with 8 real-valued attributes. The data is accessible at ftp://ftp.ics.uci.edu/pub/machine-learning-databases/pima-indians-diabetes.

Using IBM Intelligent Miner for Data V6.1, the Pima Indians Diabetes Dataset was clustered using the Neural Clustering Algorithm, specifying a maximum number of 4 clusters. Active variables were all, except for class variable. The result of the clustering run consists of 4 clusters. Afterwards, four new columns holding $\zeta_{c_i}$, i=1, 2, 3, 4 as defined in equation (1) were introduced to build the necessary linear regression models. After calculating those models, the value of the absolute clustering criterion could be retrieved from the Regression Anova table in the results page, listed as R-Squared. The following table shows the clusters with the respective values of the absolute clustering criterion.

| Cluster | Number of records | $\psi_{c_i}$ |
| --- | --- | --- |
| $c_0$ | 139 | 0.485479 |
| $c_1$ | 229 | 0.459340 |
| $c_2$ | 232 | 0.771137 |
| $c_3$ | 168 | 0.337445 |

As you can see by the results, cluster $c_2$ is by far the most sharply separable cluster, while $c_3$ is the worst in terms of being separable. $c_0$ and $c_1$ are acceptable though not exceptional.

This is because the distributions of the two most important attributes in cluster $c_2$ are distinctively different from the distributions of these attributes in all of the records, having only members that have extremely low values for these two attributes.

The same goes for clusters $c_0$ and $c_1$, though the distributions are not as contrary as in the case of $c_2$. Cluster $c_3$ is not so distinctive, as its two most important attributes have a distribution that follows the distribution of all records rather closely.

Utilizing the technique of hierarchical clustering, we make cluster $c_3$ subject to a further clustering run, splitting $c_3$ up into further clusters. This time we use the Demographic Clustering algorithm to illustrate that the presented overall clustering quality criterion is applicable to all clustering algorithms. We specify a maximum of 3 clusters, because we are not interested in increasing the total number of clusters too much. We will therefore receive 3 additional clusters $c_{3_0}$, $c_{3_1}$ and $c_{3_2}$, which will give us the overall clustering of $c_0$, $c_1$, $c_2$, $c_{3_0}$, $c_{3_1}$, and $c_{3_2}$.

Once again, respective linear regression models for calculation of $$\zeta_{c_i},$$

i=1, 2, 3 were built like before, and the results can be seen in the following table:

| Cluster | Number of records | $\psi_{c_{3_i}}$ |
| --- | --- | --- |
| $c_{3_0}$ | 64 | 0.121319 |
| $c_{3_1}$ | 56 | 0.415527 |
| $c_{3_2}$ | 48 | 0.576034 |

As one would expect, Demographic Clustering found new clusters $c_{3_1}$ and $c_{3_2}$ with much better values for the absolute clustering criterions $$\psi_{c_{3_1}} = 0.415527 \text{ and } \psi_{c_{3_2}} = 0.576034$$

than what the former cluster $c_3$ had with $$\psi_{c_3} = 0.337445.$$

As is illustrated in this example, applying the overall clustering quality criterion greatly improves the process of finding a good clustering for a given set of records.

Figure 2:
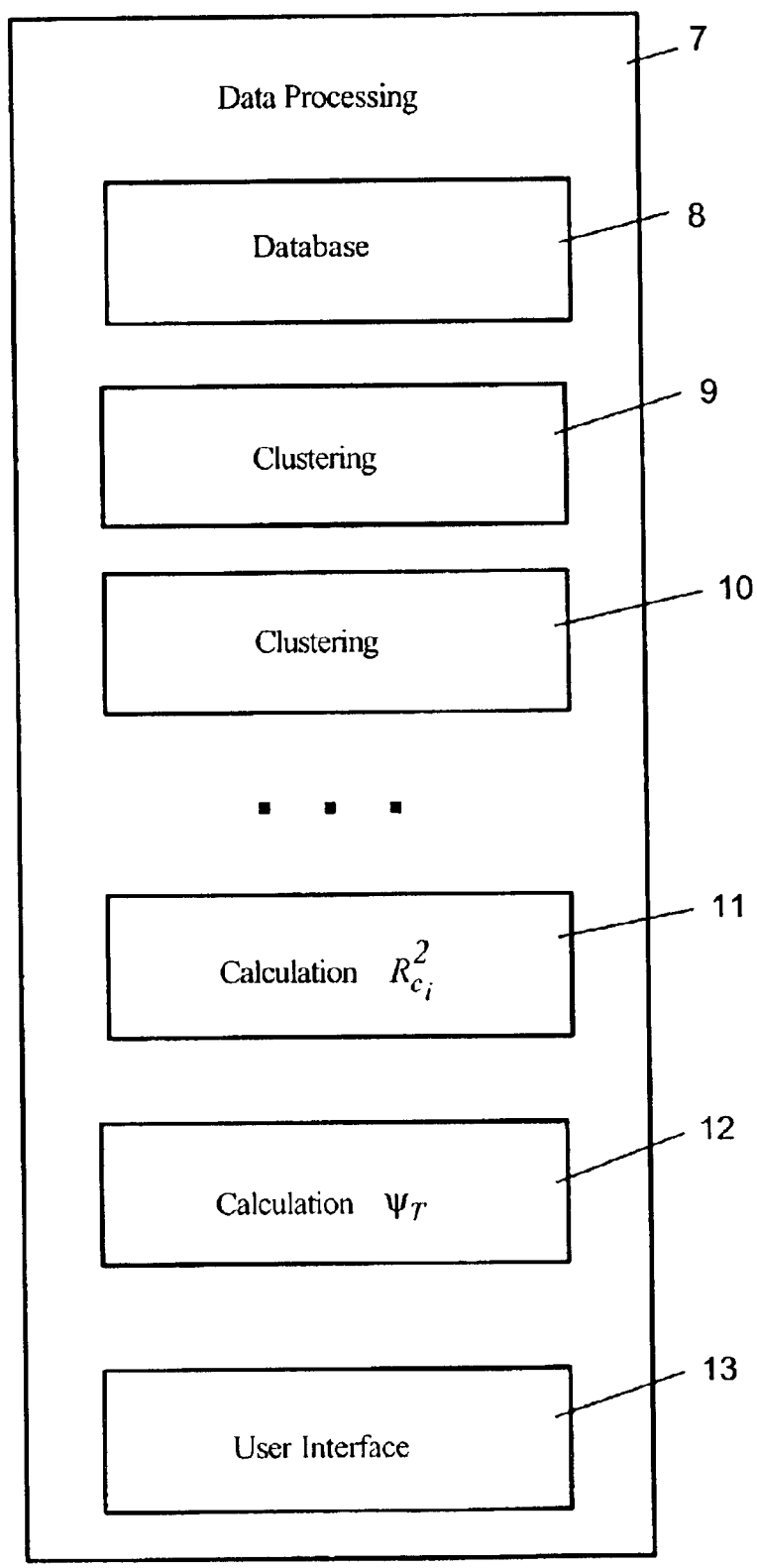
FIG. 2 is a block diagram of an embodiment of a computer system in accordance with the present invention.

FIG. 2 shows an embodiment of a data processing system of the present invention. The data processing system 7 has a database 8 for storing of N records $r_j$.

Further the data processing system 7 has a program module 9 for performing a first clustering method such as demographic clustering and a program module 10 for performing an alternative clustering method such as clustering based on neural networks. The data processing system 7 can comprise further program modules implementing a variety of further data clustering methods.

Further the data processing systems 7 has a program module 11 for calculation of $$R_{c_i}^2$$

in accordance with equation (6).

The program module 12 of the data processing system 7 serves to calculate the overall quality measure in accordance with equation (7).

Further the data processing 7 has a user interface 13. In operation a user can select one of the clustering methods provided by the program modules 9, 10 . . . . After the data clustering has been performed the program modules 11 and 12 are started in order to calculate the quality of each individual cluster and also the overall quality measure for the data clustering.

The corresponding values are outputted via the user interface 13. Based on this information the user can decide whether the quality of the individual clusters and/or the overall quality are sufficient or not. In the later case the user can select to perform further clustering steps on one or more of the clusters where the quality is insufficient. For the further clustering the user can select an alternative clustering method provided by one of the respective program modules, i.e. program module 10, . . . of the data processing system 7.

What is claimed is:

1. A method for determining a quality for a data clustering, said data clustering resulting in a plurality of clusters each cluster having a cluster identifier, the method comprising the steps of:

determining a set of observed values for at least one of the clusters by mapping the cluster identifier of said one of the clusters to a first predefined value and by mapping the cluster identifiers of other clusters to a second predefined value, and calculating a normalized statistical coefficient based on the set of observed values to determine the quality for said one of the clusters.

2. The method of claim 1, whereby the normalized statistical coefficient being the R squared coefficient, which is calculated on the basis of the set of observed values for said one of the clusters.

3. The method of claim 2, whereby the set of observed values is determined for each of the clusters and whereby the normalized statistical coefficient is calculated for each of the clusters based on the respective sets of observed values.

4. The method of claim 3, further comprising calculating an overall quality for the data clustering on the basis of the normalized statistical coefficients of the clusters.

5. The method of claim 4, whereby the overall quality is calculated by determining a weighted average of the normalized statistical coefficients of the clusters, whereby the weighting factor for each cluster is the number of records within that cluster.

6. A method of data clustering comprising the steps of:

performing a first data clustering by means of a first data clustering method, determining the quality for the first data clustering by means of a method in accordance with any one of the preceding claims 1 to 5, selecting at least one cluster with a relatively low normalized statistical coefficient, performing a second data clustering by means of the first data clustering method or by means of a second data clustering method with respect to the selected cluster, and determining the quality of the second data clustering with respect to the selected cluster.

7. The method of claim 6, whereby the steps of selecting of at least one of the clusters, applying the first or the second data clustering method and determining the quality with respect to the selected cluster are performed iteratively.

8. A data processing system comprising:

means (8) for storing a number of records, means (9, 10) for performing a data clustering of the records into a plurality of clusters each having a cluster identifier, means (11) for determining a set of observed values for each of the clusters by mapping the cluster identifier of a given cluster to a first predefined value and by mapping the cluster identifiers of other clusters to a second predefined value, and means (11) for calculating a normalized statistical coefficient based on the set of observed values.

9. The data processing system of claim 8, wherein the means for calculating the normalized statistical coefficient are adapted to calculate the R squared coefficient.

10. The data processing system of claim 9, further comprising means (12) for calculating an overall quality on the basis of the normalized statistical coefficients of the clusters.

11. The data processing system of claim 10, wherein the means for calculating the overall quality being adapted to calculate a weighted average of the normalized statistical coefficients of the clusters, the weighting factor for each cluster being the number of records within that cluster.

12. The data processing system of any one of the preceding claims 8 to 11, wherein the means for data clustering being adapted to perform the data clustering in accordance with a first data clustering method and in accordance with a second data clustering method.

13. A computer-readable storage medium tangibly embodying a program of computer instructions for performing a method in accordance with any one of the preceding claims 1 to 5.

14. A computer-readable storage medium tangibly embodying a program of computer instructions for performing a method in accordance with claim 6.

* * * * *